United States Patent [19]

Kawashima et al.

[11] Patent Number: 5,169,892

[45] Date of Patent: Dec. 8, 1992

[54] POLYPHENYLENE SULFIDE RESIN COMPOSITION

[75] Inventors: Kiyotaka Kawashima, Takaishi; Shigeaki Nagano, Izumiohtsu, both of Japan

[73] Assignee: Dainippon Ink and Chemicals Inc., Tokyo, Japan

[21] Appl. No.: 515,914

[22] Filed: Apr. 27, 1990

[30] Foreign Application Priority Data

Apr. 28, 1989 [JP] Japan .................................. 1-107257

[51] Int. Cl.$^5$ ............................ C08K 5/04; C08K 5/09
[52] U.S. Cl. .................................... 524/394; 524/399; 524/400; 524/424; 524/432; 524/433
[58] Field of Search ............... 524/399, 400, 424, 394, 524/432, 433

[56] References Cited

U.S. PATENT DOCUMENTS

| | | | |
|---|---|---|---|
| 4,490,522 | 12/1984 | Kawabata et al. | 528/388 |
| 4,529,769 | 7/1985 | Johnson et al. | 524/425 |
| 4,761,188 | 8/1988 | Miyata | 524/424 |

FOREIGN PATENT DOCUMENTS 61-120856 7/1986 Japan .

Primary Examiner—John C. Bleutge
Assistant Examiner—Helen F. Lee
Attorney, Agent, or Firm—Armstrong & Kubovcik

[57] ABSTRACT

A polyphenylene sulfide resin composition including a polyphenylene sulfide resin and a metal salt solid solution represented by formula (I)

$$[(Mg)_{y1}(M')_{y2}]_{1-x}M''_x(OH)_2A_{x/n} \cdot mH_2O \qquad (I)$$

wherein M' is at least one divalent metal element selected from the group consisting of zinc (Zn), cadmium (Cd), lead (Pb), calcium (Ca), and strontium (Sr);

M" is a trivalent metal element;

A is an n-valent anion;

x is a positive number in the range of $0 < x \leq 0.5$;

y1 and y2 are positive numbers which satisfy a relationship of $0.5 \leq y1 + y2 < 1$;

m is 0 or a positive number in the range of $0 < m < 2$; and n is an integer in the range of 1 to 3, and provides a resin composition which reduces generation of gases corrosive to metals from the polyphenylene sulfide resin.

6 Claims, 1 Drawing Sheet

POLYPHENYLENE SULFIDE RESIN COMPOSITION

BACKGROUND OF THE INVENTION

1. Field of the Invention

The present invention relates to a polyphenylene sulfide (hereafter, referred to as PPS) resin composition for use in molding which can reduce the occurrence of corrosion in metal molds used during molding operations as well as the occurrence of corrosion in metal portions of assembled parts using molded articles produced from such resin composition.

2. Prior Art

As is well known, PPS resins have a very high heat resistance, chemical resistance, electric characteristics and flame resistance and in addition they exhibit an excellent mechanical strength, rigidity and dimensional stability when reinforced with a reinforcing filler or the like. Therefore, they are used widely in various molding applications such as production of electric and electronic parts, parts of automobiles and even parts of machines.

However, PPS resins cause problems in that they generate gases which are corrosive to metals at high temperatures or in a molten state, with the result that metal molds and molding machines would be corroded during the molding operation, or when molded articles are aged at a temperature not lower than 100° C. and not higher than the melting point of the resin, metal portions of assembled parts including the molded articles or inserted metal parts would be corroded. Various problems can result, for instance, relay bases in which PPS resin is used would often suffer the occurrence of corrosion on its metal contact, resulting in poor contact, and in other occasions, adhesion of soldering in inserted metal portions decreases due to its corrosion.

Conventional proposals for overcoming the above-described problems include a method in which an alkali metal hydroxide or carbonate is added as described in U.S. Pat. No. 4,017,450, a method in which a hydroxide, oxide or aromatic carboxylic acid salt of a metal belonging to the group IIA of the periodic table as described in Japanese Patent Publication (Kokai) No. Sho 62-109850, and the like.

However, none of the conventional proposals were successful in giving sufficient effects. The compounds used in either methods are soluble in water or hygroscopic if insoluble in water, resulting in that the addition of the above-described compounds decreases the water resistance of the resulting resin composition, and accordingly, when the resin composition is used as an insulation material as reinforced with glass fiber or the like, the insulation characteristics of the material under highly hygroscopic conditions decreases to a greater extent.

Also, a method is known in which hydrotalcite is added to PPS resin in order to reduce metal corrosiveness as described in U.S. Pat. No. 4,529,769. However, this method is inferior in the effect of reducing the metal corrosiveness as compared with the method in which an alkali metal hydroxide or carbonate is added, although its water resistance and insulation characteristics do not decrease so much.

SUMMARY OF THE INVENTION

It is an object of the present invention to provide a polyphenylene sulfide resin composition which makes use of excellent properties of PPS resin, which does not decrease insulation characteristics of a water resistant, insulating material derived from the PPS resin when it is used under highly hygroscopic conditions, and which greatly decreases particularly the corrosion of metals during molding operation, that of metal portions of assembled parts including molded articles produced from the PPS resin, and that of inserted metal parts inserted in the resin composition.

Therefore, the present invention provides a PPS resin composition comprising a PPS resin and a metal salt solid solution represented by general formula (I)

$$[(Mg)_{y1}(M')_{y2}]_{1-x}M''_x(OH)_2A_{x/n} \cdot mH_2O \quad (I)$$ 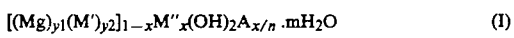

wherein M' is at least one divalent metal element selected from the group consisting of zinc (Zn), cadmium (Cd), lead (Pb), calcium (Ca), and strontium (Sr);

M'' is a trivalent metal element;

A is an n-valent anion;

x is a positive number in the range of $0 < x \leq 0.5$;

y1 and y2 are positive numbers which satisfy a relationship of $0.5 \leq y1 + y2 < 1$;

m is 0 or a positive number in the range of $0 < m < 2$;

and n is an integer in the range of 1 to 3.

The above and other objects, effects, features and advantages of the present invention will become more apparent from the following description of embodiments thereof taken in conjunction with the accompanying drawing.

BRIEF DESCRIPTION OF THE ACCOMPANYING DRAWING

The single figure is a longitudinal cross sectional view of a metal apparatus in which pellets made of the resin composition of the present invention are stored for the examination of metal corrosion tests.

DETAILED DESCRIPTION OF THE INVENTION

Figure 1:
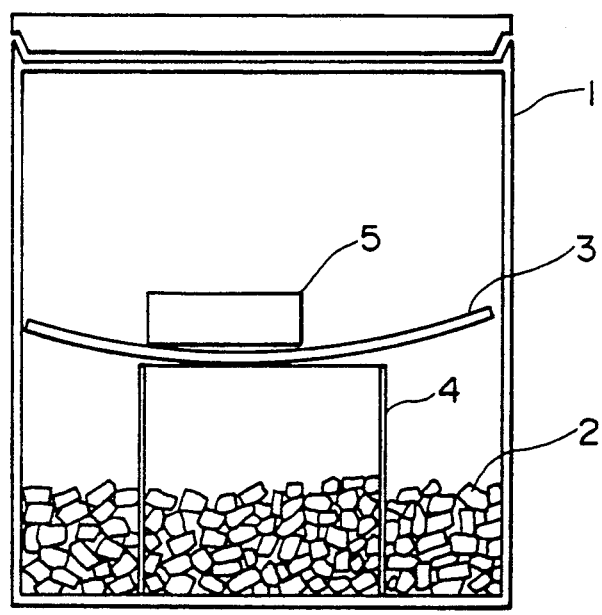

A major feature of the resin composition of the present invention is that the occurrence of corrosion on metal molds for molding operation and metal portions of assembled parts including molded articles produced from the resin composition as well as inserted metal parts is greatly decreased, and that when it is used as particularly good water resistant, insulating material, it exhibits excellent insulating characteristics under highly hygroscopic conditions. As described above, most of the hydroxides and carbonates of elements which belong to the group IIA of the periodic table are readily soluble in water, and most of the hydroxides and oxides of elements which belong to the group IIA of the periodic table are hygroscopic.

Generally, the term "hydrotalcite" is used as a generic name of carbonates of hydroxides of aluminum (Al) and magnesium (Mg), and their hydrates. Hydrotalcite itself is insoluble in water, and a mechanism of capturing and neutralizing corrosive gases which it gives is based on exchange and transfer of ions dependent on $CO_3^{--}$ in its stereochemical structure in contrast to the case of hydroxides of metals belonging to the groups IA and IIA and therefore it is inferior to the hydroxides of metals belonging to the groups IA and IIA of the periodic table with respect to the activity on corrosive gases and capturing speed although it causes less decrease of water resistance and the like.

On the other hand, the metal solid solution added to the resin composition of the present invention is insoluble in water and has a very high activity for capturing gases which are corrosive to metals derived from the PPS resin.

According to the present inventors' supposition, although the metal solid solution added to the resin composition of the present invention, like hydrotalcite, would capture and neutralize gases which are corrosive to metals by means of the exchange and transfer of ions, the metal solid solution used in the present invention contains at least in the form of a solid solution one or more elements selected from the group consisting of Zn, Cd, Pb, Ca and Sr each of which has an ionic radius obviously larger than that of Mg which is present in the chemical structure of hydrotalcite, resulting in that its neutralization speed is improved as compared with that of hydrotalcite whose capturing and neutralizing capabilities depend on only $CO_3^{--}$, and also its neutralization capacity is increased by no less than 50% higher than that of hydrotalcite, thus exhibiting effects of the present invention.

In other words, the decisive difference between hydrotalcite and the metal solid solution used in the present invention is in the stereo structure which bears exchange and transfer of ions, and because of formation of a solid solution with a divalent metal which has an ionic radius larger than that of Mg, the metal solid solution has a capability and speed of capturing gases corrosive to metals much higher than those of hydroxides of the metals belonging to the groups IA and IIA of the periodic table, and the like.

Therefore, it is believed that the resin composition of the present invention can to a greater extent reduce gases corrosive to metals generated by PPS resin and has a remarkably improved water resistance, and is extremely excellent in an insulation characteristics as represented by volume resistivity (or specific volume resistance) under highly hygroscopic conditions over a long period of time when it is used as an insulating material.

The PPS resin which is used in the present invention has a structural unit represented by formula

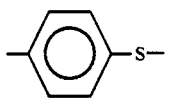

in an amount of preferably no less than 90 mol %. If the amount of the structural unit is less than 90 mol %, it is difficult to obtain a resin composition which has excellent properties. Methods for the polymerization of the polymer include a method in which p-dichlorobenzene is polymerized in the presence of sulfur and sodium carbonate, a method in which p-dichlorobenzene is polymerized in a polar solvent in the presence of sodium sulfide, or sodium hydrosulfide and sodium hydroxide, or hydrogen sulfide and sodium hydroxide, a method in which p-chlorothiophenol is self-condensed, and the like. However, particularly preferred is a method in which sodium sulfide and p-dichlorobenzene are reacted in an amide solvent such as N-methylpyrrolidone, dimethylacetamide or the like, or a sulfone solvent such as sulfolane or the like. Upon carrying out the reaction, it is preferred to add an alkali metal salt of a carboxylic acid or a sulfonic acid, or an alkali hydroxide in order to control the degree of polymerization.

The polymer may contain various bonds as described below as copolymerizable components as far as they do not give an appreciable adverse effect on the crystallinity of the polymer. Specific examples of such bonds include a meta bond

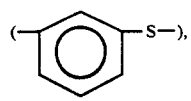

an ether bond

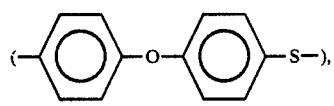

a sulfone bond

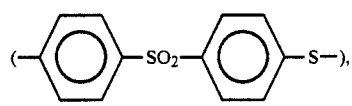

a biphenyl bond

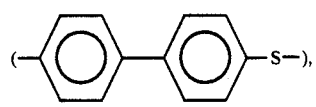

a substituted phenylsulfide bond

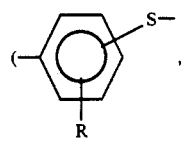

wherein R represents an alkyl group a nitro group, a phenyl group, or an alkoxy group), a trifunctional phenylsulfide bond

and the like. Usually, the copolymerizable components may be contained in an amount of less than 10 mol %, preferably no more than 5 mol %. Particularly, when the copolymerizable components are trifunctional or more phenyl, biphenyl, naphthylsulfide, and the like bonds, their amount is no more than 3 mol %, preferably no more than 1 mol %.

Such PPS resin can be synthesized by generally used production methods, for example, (1) a reaction between a halogen-substituted aromatic compound and an alkali sulfide as described in U.S. Pat. No. 2,513,188, Japanese Patent Publications (Kokoku) Nos. Sho 44-17671 and Sho 45-3368, (2) a condensation reaction of a thiophenol in the presence of an alkali catalyst or a copper salt, and the like as described in U.S. Pat. No.

3,274,165, British Patent 1,160,660, (3) a condensation reaction of an aromatic compound with thionyl chloride in the presence of a Lewis acid catalyst as described in Japanese Patent Publication (Kokoku) No. Sho 46-27255, Belgian Patent 29,437, and the like. Any appropriate methods may be selected depending on purposes.

The metal solid solution to be added in the resin composition of the present invention, which has a chemical structure represented by general formula (I) above, can be produced by a well known method except that a component which gives rise to Mg and at least one component which can give rise to M' are used together. For example, it can be produced by one of the conventional methods described in Japanese Patent Publications (Kokoku) Nos. Sho 46-2280, Sho 47-32198, Sho 50-30039, Sho 48-29477 and Sho 51-29129 with simultaneously using a component which can give rise to Mg and at least one component which can give rise to M' in general formula (I).

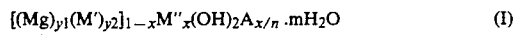

$$[(Mg)_{y1}(M')_{y2}]_{1-x}M''_x(OH)_2A_{x/n} \cdot mH_2O \quad (I)$$

wherein M' is at least one divalent metal element selected from the group consisting of Zn, Cd, Pb, Ca, and Sr;

M" is a trivalent metal element;

A is an n-valent anion;

x is a positive number in the range of $0 < x \leq 0.5$;

y1 and y2 are positive numbers which satisfy a relationship of $0.5 \leq y1 + y2 < 1$;

m is 0 or a positive number in the range of $0 < m < 2$;

and n is an integer in the range of 1 to 3.

In general formula (I) above, M' is at least one divalent metal selected from the group consisting of Zn, Cd, Pb, Ca, and Sr, and may be selected appropriately. Among them, preferred are Zn and Pb, with Zn being particularly preferred. In general formula (I) above, M" is a trivalent metal, for example, Al, Bi, Fe, Cr, and the like. Furthermore, A in general formula (I) above stands for an n-valent anion, for example, $I^-$, $OH^-$, $HCO_3^-$, $CO_3^{2-}$, a salicylic acid ion, $CrO_4^{2-}$, $(COO)_2^{2-}$,

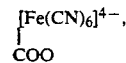

$[Fe(CN)_6]^{4-}$, $\begin{array}{c} | \\ COO \end{array}$ and the like.

In general formula (I) above, x is a positive number in the range of $0 < x \leq 0.5$, preferably $0.2 \leq x \leq 0.5$, and more preferably $0.2 \leq x \leq 0.4$. On the other hand, y1 and y2 are positive numbers which satisfy a relationship of $0.5 \leq y1 + y2 < 1$, and m is 0 or a positive number in the range of $0 < m < 2$.

The metal solid solution used in the present invention shows a powder X-ray diffraction pattern similar to that of general hydrotalcite. However, the lattice constant of the metal solid solution varies according to a general rule which is applied to solid solutions, and therefore its lattice constant becomes greater than that of hydrotalcite according as the amount of M' having an ionic radius larger than Mg contained in the form of solid solution increases and the ionic radius of M' is larger. In order to render its dispersibility in the PPS resin, the metal solid solution used in the present invention is adjusted so as to have a mean secondary particle size of preferably about 0.1 to 10 μm, and more preferably 5 to 10 μm where the mean secondary particle size is defined as a mean particle size of secondary particles that are agglomerates of crystal particles (i.e., primary particles), and a BET specific surface area (i.e., surface area of a adsorbent calculated according to an isothermal adsorption according to the equation of Brunauer-Emmett-Teller) of preferably no more than about 200 m²/g, and more preferably 50 to 150 m²/g. That is, a metal solid solution having a desired mean secondary particle size and BET specific surface area can be obtained by heating the metal solid solution represented by general formula (I) above under certain conditions, for example, at a temperature of about 120 to 250° C. for about 5 to 40 hours in, for example, an autoclave or an aqueous medium. It is preferred to treat the metal solid solution at about 120° to 350° C. for 1 to 40 hours in the air or in an atmosphere of $N_2$, He or the like to dehydrate it, i.e., to remove water of crystallization therefrom. In other words, it is preferred to render m = 0 or a value as small as possible (as close to 0 as possible) because capability of capturing gases corrosive to metals and its capturing speed are improved. In addition, in order to improve its dispersibility in the PPS resin, the metal solid solution of the present invention may be treated of its surface with a higher fatty acid, an anion based surface active agent, a silane based coupling agent, a titanate based coupling agent, a glycerin ester of a fatty acid, or the like as far as the object of the present invention will not be injured.

The metal solid solution of the present invention can be added in an amount of, preferably 0.01 to 10 parts by weight per 100 parts by weight of the PPS resin. When the amount of the metal solid solution added is in that specified range, the effect of reducing gases corrosive to metals is sufficiently high and the resin composition has a good melt flowability and maintains a high level of strength.

Various reinforcement materials and fillers may be added to the resin composition of the present invention in order to improve its mechanical strength. Specific examples of the reinforcement materials and fillers which can be used in the present invention include glass fiber, carbon fiber, potassium titanate, silicon carbide, ceramics fiber, metal fiber, silicon nitride, barium sulfate, calcium sulfate, kaolin, clay, bentonite, sericite, zeolite, mica, talc, wollastonite, PMF, ferrite, calcium silicate, calcium carbonate, dolomite, antimony trioxide, titanium oxide, iron oxide, milled glass, glass bead, glass balloon, and the like.

The resin composition of the present invention may contain lubricants and stabilizers therefor such as graphite, molybdenum disulfide, polytetrafluoroethylene, and the like.

The resin composition of the present invention may contain an anti-oxidant, a thermal stabilizer, an ultraviolet absorbent, a lubricant, a nucleating agent, a colorant, a silane coupling agent, a releasing agent, and the like in an amount such that the objects of the present invention are not injured without limiting the scope of thereof.

The resin composition of the present invention may be blended with one or more thermosetting resins and-/or other thermoplastic resins in an amount such that the objects of the present invention are not injured. For example, one or more of epoxy resins, silicone resins, polyimides, polyphenylene ethers, polyamides, polycarbonates, polysulfones, polyether sulfones, polyallylates, polyacetals, polyether ketones, polyether ether ketones, polybutylene terephthalates, polyethylene terephthalates, polyamide-imides, polyether imides, and the like can be blended with the resin composition of the present invention in small amounts.

The resin composition of the present invention can be produced by various conventional methods. For example, it can be produced by pre-mixing PPS resin and compounds to be added in a Henschel mixer, a tumbler or the like, supplying the resulting mixture to a single-screw or twin-screw extrusion kneader or the like, melt-kneading the kneaded mixture at 280° C. to 360° C., and granulating it.

Upon the mixing, other reinforcement material, fillers and various additives may be added to the mixture.

The resin composition of the present invention can be applied to various utilities such as electric and electronic parts, parts of machines, parts of automobiles, and the like. When it is used as an insulating material, it is particularly useful as an industrial material such as parts of switches, parts of relays, connectors, and the like.

The resin composition of the present invention reduces to a greater extent gases corrosive to metals generated by the PPS resin contained therein to thereby reduce to a greater extent the occurrence of corrosion in metal molds for molding operation, metal portions of assembled products including molded articles produced from the resin composition and inserted metal parts inserted in the resin composition, and the like. Furthermore, the resin composition of the present invention has an excellent moisture resistance and insulation characteristics when it is used as a material having a good water resistance and insulation characteristics.

EXAMPLES

Hereafter, the present invention will be explained in greater detail with reference to examples which are merely by way of example but the present invention should in no way be construed as being limited thereto. In the examples, test results of various properties shown therein were obtained according to the following methods and standards.

Metal Corrosiveness

As shown in the single figure, a sealed metal container 1 was provided, in which 100 g of granulated pellets 2 of each composition was introduced. The container 1 was provided with a 20-mesh metal gauze 3 fixed to the container 1 with a metal plate 4. On the metal gauze 3 was placed a steel block 5 made of SKD-11, a high alloy tool steel having a composition of 1.5% C, 12.0% Cr, 1.0% Mo, and 0.4% V, the surface roughness of the steel block 5 being no higher than 3 μm, and the steel block 5 was heated at 340° C. for 6 hours. After the heating, the steel block 5 made of SKD-11 was taken out of the container 1 and introduced in an incubator kept at 70° C./95% RH (relative humidity) and left therein for 6 hours, followed by observation on the state of corrosion of the steel.

Water Resistance

A dumbbell test pieces for tensile tests having a thickness of 1.6 mm were molded from granulated pellets produced from each composition, and after they were subjected to Pressure Cooker Treatment (PCT) under the conditions of 120° C. and 2 kg.f/cm$^2$ for 30 hours, the test pieces were measured for their tensile strength and the results obtained were compared with initial ones. The measurement of tensile strength was performed according to ASTM D-638.

Insulation Characteristics

Discs having a thickness of 1.6 mm as test pieces for ASTM D-257 measurement were molded from granulated pellets of each composition. After they were subjected to Pressure-Cooker Treatment (PCT) under the conditions of 120° C. and 2 kg.f/cm$^2$ for 30 hours, the test pieces were measured for their volume resistivity and the results obtained were compared with initial ones. The measurement of volume resistivity was performed according to ASTM D-257.

Reference Example 1

In a 50 liter scale autoclave were charged, in molar proportion, 70 moles of N-methylpyrrolidone, 0.99 mole of sodium sulfide nonahydrate, 0.60 mole of sodium benzoate and 0.15 mole of sodium hydroxide (50 mole scale), and the mixture was heated up to 210° C. in a nitrogen flow to dehydrate the mixture until dehydration ratio reached 110%. After cooling the reaction system to 160° C., p-dichlorobenzene was charged in a molar proportion of 1.0 mole. After sealing, the inside pressure of the autoclave was increased to 2.5 kg/cm$^2$ by the introduction of nitrogen. Taking into consideration generation of heat as the result of polymerization, the temperature was controlled. After elevating the temperature to 270° C., polymerization was continued for 5 hours while stirring. Then, the inside pressure increased to 17 kg/cm$^2$. Next, after cooling the reaction system, the pressure was released, and the contents were poured into a large amount of water to recover a polymer in the form of flakes. The polymer was washed repeatedly with hot water and acetone, and finally, white flakes were obtained in a yield of 70%.

The PPS resin powder thus obtained was charged in a ribbon blender and stirred at 270° C. with blowing air thereinto to partially crosslink the PPS resin in the form of powder so that its intrinsic viscosity reached to 0.3.

Examples 1 to 6 and Comparative Examples 1 to 6

After uniformly blending the PPS resin synthesized in Reference Example 1 with starting materials shown in Table 1 in blending proportions shown in Table 1, the resulting mixture was melt-kneaded at 320° C. using a 35 mm-ϕ twin-screw extruder to obtain pellets. Using the pellets, metal corrosiveness was evaluated. On the other hand, the pellets were molded using an in-line screw type 3-ounce injection molding machine under the conditions of a cylinder temperature of 320° C., a metal mold temperature of 150° C., an injection pressure of 1,000 kg f/cm$^2$, and an injection speed of moderate speed to obtain test pieces for the evaluation of water resistance and insulation characteristics. The test pieces were evaluated for the both characteristics. The results obtained are shown in Table 1.

TABLE 1

|  | Ex. 1 | Ex. 2 | Ex. 3 | Ex. 4 | Ex. 5 | Ex. 6 |
| --- | --- | --- | --- | --- | --- | --- |
| Composition (Parts by Weight) | | | | | | |
| PPS Resin | 60 | 40 | 55 | 40 | 40 | 40 |

TABLE 1-continued

| Additive | MSS-A[1] | MSS-A[1] | MSS-B[2] | MSS-B[2] | MSS-C[3] | MSS-C[3] |
|---|---|---|---|---|---|---|
| Amount of Additive | 3 | 1 | 1 | 3 | 3 | 3 |
| Glass Fiber | 40 | 30 | 30 | 30 | 30 | 30 |
| Calcium Carbonate | — | 30 | — | — | — | — |
| Polytetrafluoroethylene | — | — | 15 | — | — | — |
| Mica | — | — | — | 30 | — | — |
| Talc | — | — | — | — | 30 | — |
| Calcium Sulfate | — | — | — | — | — | 30 |
| Metal Corrosiveness[5] | A | A | A | A | A | A |
| Water Resistance (Tensile Strength: kg·f/cm$^2$) | | | | | | |
| Initial | 1850 | 1400 | 1350 | 1500 | 1000 | 1100 |
| After PCT | 1600 | 1250 | 1200 | 1350 | 900 | 1000 |
| Insulation Characteristics (Volume Resistivity: ohm·cm) | | | | | | |
| Initial | $3 \times 10^{16}$ | $4 \times 10^{16}$ | $1 \times 10^{16}$ | $8 \times 10^{16}$ | $6 \times 10^{16}$ | $5 \times 10^{16}$ |
| After PCT | $2 \times 10^{14}$ | $1 \times 10^{14}$ | $2 \times 10^{14}$ | $8 \times 10^{13}$ | $4 \times 10^{14}$ | $6 \times 10^{14}$ |

| | C. Ex. 1 | C. Ex. 2 | C. Ex. 3 | C. Ex. 4 | C. Ex. 5 | C. Ex. 6 |
|---|---|---|---|---|---|---|
| Composition (Parts by Weight) | | | | | | |
| PPS Resin | 60 | 60 | 40 | 40 | 40 | 60 |
| Additive | HTC[4] | Li$_2$CO$_3$ | Ca(OH)$_2$ | MgO | NaOH | None |
| Amount of Additive | 3 | 1 | 1 | 3 | 3 | 0 |
| Glass Fiber | 40 | 40 | 30 | 30 | 30 | 40 |
| Calcium Carbonate | — | — | — | — | — | — |
| Polytetrafluoroethylene | — | — | — | — | — | — |
| Mica | — | — | — | 30 | — | — |
| Talc | — | — | — | — | 30 | — |
| Calcium Sulfate | — | — | — | — | — | — |
| Metal Corrosiveness[5] | C | B | C | B | B | D |
| Water Resistance (Tensile Strength: kg·f/cm$^2$) | | | | | | |
| Initial | 1750 | 1700 | 1300 | 1500 | 900 | 1800 |
| After PCT | 1400 | 1200 | 1000 | 1000 | 650 | 1700 |
| Insulation Characteristics (Volume Resistivity: ohm·cm) | | | | | | |
| Initial | $3 \times 10^{16}$ | $2 \times 10^{16}$ | $4 \times 10^{16}$ | $6 \times 10^{16}$ | $6 \times 10^{16}$ | $1 \times 10^{16}$ |
| After PCT | $1 \times 10^{12}$ | $2 \times 10^{10}$ | $4 \times 10^{11}$ | $3 \times 10^{10}$ | $2 \times 10^{10}$ | $3 \times 10^{14}$ |

Notes for Table 1
[1] MSS-A stands for metal solid solution A of a composition of Mg$_{0.4}$Zn$_{0.3}$Al$_{0.3}$(OH)$_2$(CO$_3$)$_{0.15}$, a mean particle size of about 7 μm, and a BET specific surface area of 100 m$^2$/g.
[2] MSS-B stands for metal solid solution B of a composition of Mg$_{0.4}$Zn$_{0.3}$Al$_{0.3}$(OH)$_2$(CO$_3$)$_{0.15}$·0.55H$_2$O, a mean particle size of about 7 μm, and a BET specific surface area of 100 m$^2$/g.
[3] MSS-C stands for metal solid solution C of a composition of Mg$_{0.5}$Pb$_{0.22}$Al$_{0.28}$(OH)$_2$I$_{0.28}$·0.16H$_2$O, a mean particle size of about 7 μm, and a BET specific surface area of 100 m$^2$/g.
[4] HTC stands for hydrotalcite of a composition of Mg$_{0.7}$Al$_{0.3}$(OH)$_2$CO$_3$·0.55H$_2$O, a mean particle size of about 0.4 μm, a BET specific surface area of 12 to 14 m$^2$/g.
[5] Judgement of Metal Corrosion:
A ... No corrosion
B ... Only slight corrosion
C ... Slight corrosion
D ... Remarkable corrosion Examples 7 to 10 and Comparative Examples 7 to 9

After uniformly blending the PPS resin synthesized in Reference Example 1 with starting materials shown in Table 2 in blending proportions shown in Table 2, the resulting mixture was melt-kneaded at 320° C. using a 35 mm-φ twin-screw extruder to obtain pellets. Using the pellets, metal corrosiveness was evaluated. On the other hand, the pellets were molded using an in-line screw type 3-ounce injection molding machine under the conditions of a cylinder temperature of 320° C., a metal mold temperature of 150° C., an injection pressure of 1,000 kg f/cm$^2$, and an injection speed of moderate speed to obtain dumbbells each having a thickness of 1.6 mm for the evaluation of tensile strength. The dumbbell test pieces were evaluated for their water resistance. The results obtained are shown in Table 2.

TABLE 2

| | Ex. 7 | Ex. 8 | Ex. 9 | Ex. 10 | C. Ex. 7 | C. Ex. 8 | C. Ex. 9 |
|---|---|---|---|---|---|---|---|
| Composition (Parts by Weight) | | | | | | | |
| PPS Resin | 70 | — | — | — | — | — | — |
| Additive | MSS-A[1] | MSS-A[1] | MSS-C[2] | MSS-C[2] | HTC[3] | Li$_2$CO$_3$ | Ca(OH)$_2$ |
| Amount of Additive | 1 | 1 | 3 | 1 | 1 | 1 | 3 |
| PAN Carbon Fiber | 30 | — | — | — | — | — | — |
| Pitch Carbon Fiber | — | 30 | 15 | 30 | 30 | 30 | 15 |
| Polytetrafluoroethylene | — | — | 15 | — | — | — | 15 |
| Graphite | — | — | 10 | — | — | — | 10 |
| Molybdenum Disulfide | — | — | — | 15 | — | — | — |
| Metal Corrosiveness[4] | A | A | A | A | C | B | C |

TABLE 2-continued

|  | Ex. 7 | Ex. 8 | Ex. 9 | Ex. 10 | C. Ex. 7 | C. Ex. 8 | C. Ex. 9 |
|---|---|---|---|---|---|---|---|
| Water Resistance (Tensile Strength: kg · f/cm$^2$) | | | | | | | |
| Initial | 2000 | 1200 | 900 | 1100 | 1100 | 1100 | 800 |
| After PCT | 1800 | 1000 | 750 | 950 | 850 | 700 | 550 |

Notes for Table 2:
*1)MSS-A stands for metal solid solution A of a composition of $Mg_{0.4}Zn_{0.3}Al_{0.3}(OH)_2(CO_3)_{0.15}$ (same as shown in Table 1).
*2)MSS-C stands for metal solid solution C of a composition of $Mg_{0.5}Pb_{0.22}Al_{0.28}(OH)_2I_{0.28}\cdot 0.16H_2O$ (same as shown in Table 1)
*3)HTC stands for hydrotalcite of a composition of $Mg_{0.7}Al_{0.3}(OH)_2CO_3\cdot 0.55H_2O$ (same as shown in Table 1)
*4)Judgement of Metal Corrosion:
A . . . No corrosion
B . . . Only slight corrosion
C . . . Slight corrosion
D . . . Remarkable corrosion The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A polyphenylene sulfide resin composition comprising a PPS resin and a metal salt solid solution, said metal salt solid solution represented by a formula (I)

$$_{1-x}M''_x(OH)_2A_{x/n}\cdot mH_2O \quad (I)$$

wherein M' is at least one divalent metal element selected from the group consisting of zinc (Zn), cadmium (Cd), lead (Pb), calcium (Ca), and strontium (Sr);

M'' is a trivalent metal element;

A is an n-valent anion;

x is a positive number in the range of $0 < x \leq 0.5$;

y1 and y2 are positive numbers which satisfies a relationship of $0.5 \leq y1 + y2 < 1$;

m is 0 or a positive number in the range of $0 < m < 2$; and n is an integer in the range of 1 to 3, wherein said metal salt solid solution has a mean secondary particle size of 5-10 microns.

2. A resin composition as claimed in claim 1, wherein said metal solid solution is contained in an amount of 0.01 to 10 parts by weight per 100 parts by weight of the polyphenylene sulfide resin.

3. A molded article obtained by molding the polyphenylene sulfide resin composition of claim 1.

4. The resin composition as claimed in claim 1, wherein said metal solid solution has a BET specific surface area of 50 to 150 m$^2$/g.

5. A molded article obtained by molding the polyphenylene sulfide resin composition of claim 2.

6. A molded article obtained by molding the polyphenylene sulfide resin composition of claim 4.

* * * * *